(12) United States Patent
Horibe et al.

(10) Patent No.: US 9,453,509 B2
(45) Date of Patent: Sep. 27, 2016

(54) SCROLL COMPRESSOR

(75) Inventors: Naoki Horibe, Toyota (JP); Masaharu Hatta, Toyota (JP); Satoshi Nomura, Toyota (JP); Akira Sawamoto, Toyota (JP); Takao Masamura, Toyota (JP); Masanori Akizuki, Toyota (JP); Youichirou Tsuboi, Toyota (JP); Maki Aoki, Toyota (JP); Akio Hiraoka, Toyota (JP)

(73) Assignee: TAIHO KOGYO CO., LTD., Toyota-shi, Aichi (JP)

(*) Notice: Subject to any disclaimer, the term of this patent is extended or adjusted under 35 U.S.C. 154(b) by 190 days.

(21) Appl. No.: 14/349,982

(22) PCT Filed: Aug. 10, 2012

(86) PCT No.: PCT/JP2012/070490
§ 371 (c)(1),
(2), (4) Date: Apr. 4, 2014

(87) PCT Pub. No.: WO2013/051340
PCT Pub. Date: Apr. 11, 2013

(65) Prior Publication Data
US 2014/0301880 A1    Oct. 9, 2014

(30) Foreign Application Priority Data
Oct. 7, 2011 (JP) .................................. 2011-223245

(51) Int. Cl.
*F16C 33/24* (2006.01)
*F16C 33/04* (2006.01)
(Continued)

(52) U.S. Cl.
CPC ........ *F04C 18/0215* (2013.01); *C10M 101/02* (2013.01); *C10M 103/00* (2013.01);
(Continued)

(58) Field of Classification Search
CPC ....... F16C 33/16; F16C 33/30; F16C 33/201
USPC .................. 418/55.1; 508/108, 109, 113–131
See application file for complete search history.

(56) References Cited

U.S. PATENT DOCUMENTS

| | | | |
|---|---|---|---|
| 4,898,905 A | 2/1990 | Kawakami et al. | |
| 2007/0292294 A1* | 12/2007 | Fujita | F04C 29/02 418/55.3 |
| 2009/0297859 A1* | 12/2009 | Ohkawa | C08L 79/08 428/422 |

FOREIGN PATENT DOCUMENTS

| EP | 2 048 391 A2 | 4/2009 |
|---|---|---|
| JP | H03-3988 A | 1/1991 |

(Continued)

OTHER PUBLICATIONS

Characterization of Particles and Particle systems, W. Pabst / E Gregorova, ICT Prague 2007.*

(Continued)

*Primary Examiner* — Jesse Bogue
*Assistant Examiner* — Deming Wan
(74) *Attorney, Agent, or Firm* — Flynn, Thiel, Boutell & Tanis, P.C.

(57) ABSTRACT

A scroll compressor which can be mounted in an automobile has a slide bearing resulting from baking onto a back metal a sliding layer of 5-60 wt % graphite having an average diameter of 5-50 μm and a graphitization degree of at least 0.6, the remainder containing a polyimide resin and/or a polyamide-imide resin. The form of the graphite has: (a) an average shape factor (YAVE) as defined of 1-4 for the particles excluding the minute particles that are no greater than 0.5 times the average diameter, and there being at least 70% by number of particles having a shape factor (Y) in the range of 1-1.5; or (b) graphite particles having a particle ratio of at least 0.5 being at least 50% of the total by number.

14 Claims, 5 Drawing Sheets

(51) Int. Cl.

| | |
|---|---|
| *F04C 15/00* | (2006.01) |
| *F01C 21/00* | (2006.01) |
| *C04B 35/52* | (2006.01) |
| *C10M 169/04* | (2006.01) |
| *F04C 18/02* | (2006.01) |
| *C10M 147/02* | (2006.01) |
| *C10M 101/02* | (2006.01) |
| *C10M 103/00* | (2006.01) |
| *C10M 103/06* | (2006.01) |
| *C10M 107/38* | (2006.01) |
| *C10M 107/50* | (2006.01) |
| *C10M 125/22* | (2006.01) |
| *C10M 125/26* | (2006.01) |
| *C23C 24/08* | (2006.01) |
| *C23C 26/00* | (2006.01) |
| *F16C 17/02* | (2006.01) |
| *F16C 33/16* | (2006.01) |
| *F16C 33/12* | (2006.01) |
| *F01C 21/02* | (2006.01) |
| *F04C 23/00* | (2006.01) |
| *F04C 29/00* | (2006.01) |

(52) U.S. Cl.
CPC ......... *C10M103/06* (2013.01); *C10M 107/38* (2013.01); *C10M 107/50* (2013.01); *C10M 125/22* (2013.01); *C10M 125/26* (2013.01); *C10M 147/02* (2013.01); *C23C 24/08* (2013.01); *C23C 26/00* (2013.01); *F01C 21/02* (2013.01); *F16C 17/02* (2013.01); *F16C 33/121* (2013.01); *F16C 33/16* (2013.01); *F04C 23/008* (2013.01); *F04C 29/0042* (2013.01); *F04C 2230/92* (2013.01); *F04C 2240/56* (2013.01); *F05C 2201/0448* (2013.01); *F05C 2203/0808* (2013.01); *F05C 2225/04* (2013.01); *F05C 2225/10* (2013.01); *F05C 2251/14* (2013.01); *F05C 2253/20* (2013.01); *F16C 2208/60* (2013.01)

(56) References Cited

FOREIGN PATENT DOCUMENTS

| | | |
|---|---|---|
| JP | H05331314 A | 12/1993 |
| JP | H07223808 A | 8/1995 |
| JP | H07223809 A | 8/1995 |
| JP | 2517604 B2 | 7/1996 |
| JP | 2000-27867 A | 1/2000 |
| JP | 2004-183499 A | 7/2004 |
| JP | 2004293331 A | 10/2004 |

OTHER PUBLICATIONS

Espacenet Machine Translation JPH05331314 to Mitsuru et al, Dec. 12, 2015.*

English machine translation by Japan Platform for Patent Information for Japanese Patent 08-301667 to Isomura, Dec. 22, 2015.*

Takayuki Kato, "Trends and Tribology in Compressors for Automotive Air Conditioners", Tribologists, vol. 55, No. 9, 2010, pp. 603-608.

Hideto Nakao and Koei Matsukawa, "Tribology in Compressors for Home Appliances", Tribologists, vol. 51, No. 8, 2006, pp. 559-564.

Shoji Noguchi, "Recent Technology of Rolling Bearings", Tribologists, vol. 56, No. 5, 2011, pp. 277-282.

Kazutsugu Kashima, "Characteristics and Applications of Carbon Materials", Tribologists, vol. 49, No. 7, 2004, pp. 560-566.

Masao Uemura, "Tribology of Graphite", Tribologists, vol. 54, No. 1, 2009, pp. 4-9.

Supplementary Search Report of European Patent Office issued in Application No. 12838120.9 dated Aug. 3, 2015 (8 pages).

\* cited by examiner

SCROLL COMPRESSOR

CROSS-REFERENCE TO RELATED APPLICATIONS

This application is a 371 U.S. National Stage Application of International Application No. PCT/JP2012/070490, filed on Aug. 10, 2012, and published in Japanese as WO 2013/051340 on Apr. 11, 2013. This application claims priority to Japanese Application No. 2011-223245, filed on Oct. 7, 2011. The disclosures of the above applications are incorporated herein by reference.

TECHNICAL FIELD

The present invention relates to a compressor used in automobile air conditioners or household air conditioners, and more particularly, the present invention relates to a scroll compressor held slidably by a sliding bearing with a rotating shaft installed in a housing, the scroll compressor uses the sliding bearing resulting from baking on a back metal a sliding layer in which graphite having a high degree of graphitization and a unique shape is dispersed in a resin.

RELATED ART

A swash plate type, vane type and scroll type are types of commonly used compressor. However, a scroll compressor that is electrically driven in a hybrid or electric vehicle is being developed as explained in "Trends and tribology of car air-conditioning compressors", Tribologist, Vol. 55, No. 9, 2010, pp. 603-608).

A compressor including a rotating shaft provided rotatably within a housing, a movable scroll which pivots by the rotation of the rotating shaft, and a fixed scroll fixed to the housing is known in Japanese Laid Open Patent 2004-183499 as a car air-conditioner scroll compressor. While the bearing of the scroll compressor includes a component for rotatably supporting the center axis of the compressor and a component for rotatably supporting an eccentric shaft, both use roll bearings. A ball bearing, roll bearing and needle roller bearing are generally used as this type of roller bearing.

The specification of Japanese Patent No. 2517604 by the applicant of the present application provides a cooler compressor as a usage example and proposes a graphite-resin-based sliding material having the following composition. Graphite: 5 to 60 wt % graphite; resin: 20 to 90 wt % polyimide and/or polyimide amide; friction modifier: 0.5 to 20 wt % clay, mullite, silica and/or alumina. In addition, while this graphite is artificial or a natural graphite and has a granular or flaky shape, flakes or flake-shaped graphite are explained, as preferable since a flat surface is arranged on a sliding surface.

Japanese Laid Open Patent H3-3988 proposes using a sliding bearing baked to include graphite and a resin on a jointly sintered bimetal as a household scroll compressor bearing such as an air-conditioner or refrigerator, and uses a heat-resistant resin such as polyimide as a resin provided with self-lubrication and proper strength. In addition, using an aluminum or bronze-based sliding bearing in a household scroll compressor is explained in "Tribology of compressor used in consumer electronics products", Triboiogists, Vol. 51, No. 8, 2006, pp. 560-561.

When a general car air-conditioning compressor and a household or commercial compressor are compared, the former is exposed to harsh conditions such as ambient temperature or vibration of an attachment section, and further, since a car air-conditioning compressor driven by the engine has a large fluctuation in the number of revolutions, a roll bearing has been conventionally used as described above. The qualitative relationship between a sliding bearing and a roll bearing is summarized using the graph in "Recent technology in roll bearings", Triboiogists, Vol. 56, No. 5, 2011, p. 277, and is expressed in the following table.

TABLE 1

| Evaluation Item | Sliding Bearing | Roll Bearing |
|---|---|---|
| Functionality | Poor | Between Excellent and Poor |
| Usage Condition | Loose | Between Loose and Strict |
| Cost | Cheap | Between Cheap and Expensive |
| Demand Amount | Few | Many |

In addition, according to Japanese Laid Open Patent H7-223809, mesophase spherules (meso-carbon micro beads) are known as spherical carbon fine particles having a crystal structure similar to highly oriented graphite. Mesophase spherules are explained by heat treating coal tar, coal tar pitch or asphalt at 350 to 450° C., isolating the produced spherical crystals, and by performing a graphitization treatment at 1500 to 3000° C. after crushing, the process of spheroidization proceeds. However, mesophase spherules shown in the micrograph of this publication are significantly deformed from a true spherical form.

SUMMARY

Problems to be Solved

A bearing used in a scroll compressor of a car air conditioner is used under poor lubrication in a mixed refrigerant atmosphere and high-speed high-load. In the case of a roll bearing, it is believed that in order to ensure the roll life, it is unavoidable to form the bearing to a high level of accuracy although there is an increase in costs due to machining. However, the durability that is required is not attained despite increasing the accuracy and roll lifetime cannot be secured. Furthermore, there is a problem of damage or wear occurring when foreign matter enters from outside the bearing part that further reduces the life of the bearing. In addition, demand for a quiet compressor is increasing year by year, however, improving noise and vibration reduction in a roll bearing is difficult.

The evaluation as in Table 1 applies generally to the sliding bearing that has undergone an impregnation baking process of graphite and a resin proposed in Japanese Patent No. 2517604, and seizure resistance and abrasion resistance comparable to a roll bearing used for a conventional car air-conditioner scroll compressor cannot be achieved. In the course of studying the performance improvement of a sliding bearing from a recognition of the current situation, the inventors of the present invention focused on a spherical carbon material, for example, the graphite with a high sphericity proposed in Japanese Laid Open Patent H5-331314, was also examined, however, because its hardness was as high as 800 to 1200 Hv, they concluded that there is a problem of wear on a mating shaft. In addition, although the mesophase spherules proposed in Japanese Laid Open Patent H7-223809 are spherical, because the external shape deforms considerably from a spherical shape, it was determined that performance improvements cannot be expected.

Furthermore, household scroll compressors are required to be compact, lightweight, efficient and low cost in situations such as power shortages in recent years. In addition, in order to make the operation of a compressor efficient, it is necessary to reduce friction by reducing the diameter of the shaft of the compressor and reduce the coefficient of friction of the bearing material. From this point of view, the flake-shaped graphite examined in Japanese Patent No. 2517604 is not appropriate since the orientation is significant and there is a tendency to wear the mating shaft that is not preferred. The present inventors were successful in providing a scroll compressor including a sliding bearing having high seizure and wear resistance in addition to an improvement to the conventional technology.

SOLUTION

Figure 1:
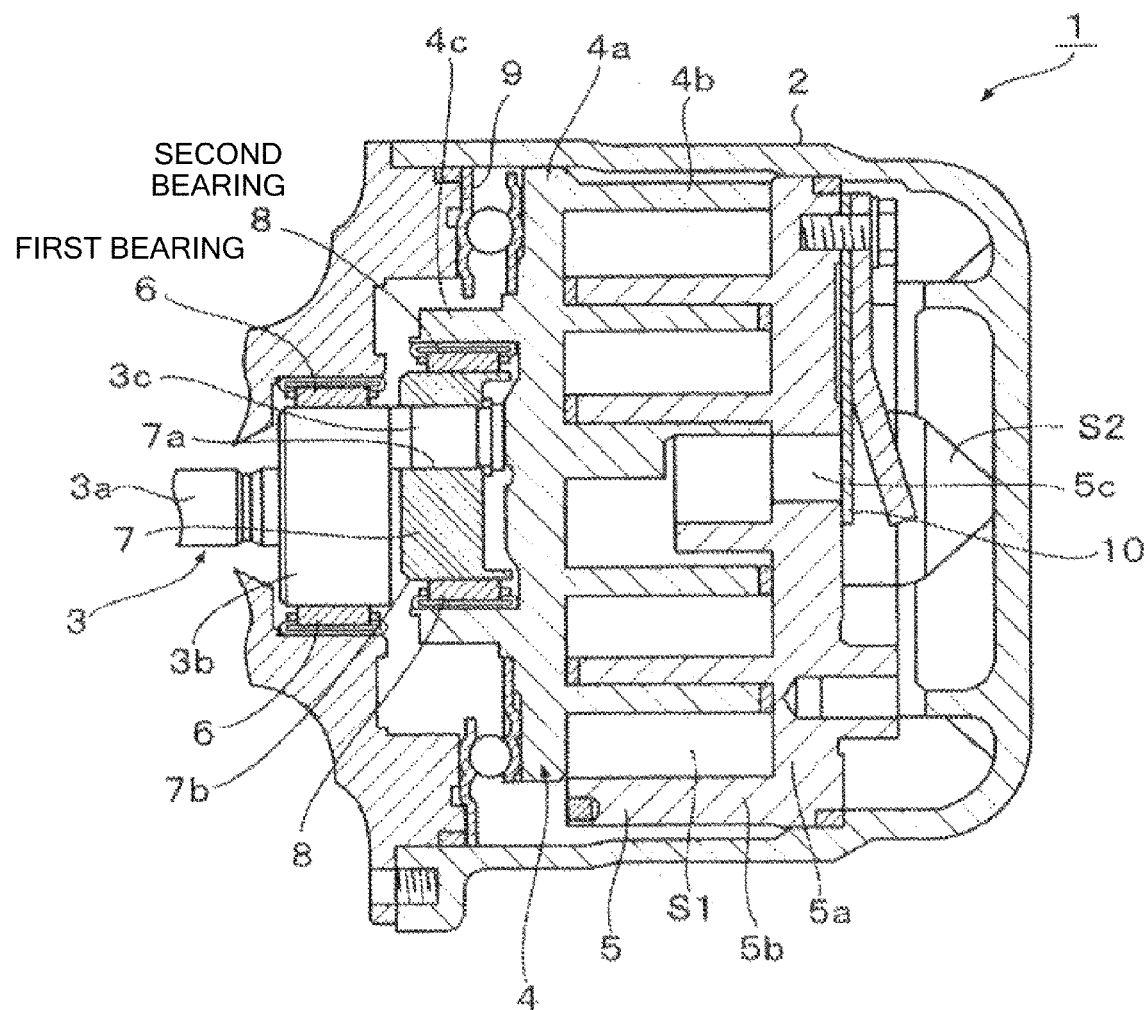
FIG. 1 shows a cross-sectional view of a scroll compressor related to one embodiment.

That is, the present invention relates to a scroll compressor including: a rotating shaft body that is installed in a housing and rotates around an axis of the housing; an eccentric shaft connected to the rotating shaft body to revolve around the axis at a position eccentric to an axis of the rotating shaft body; a movable scroll fixed to the eccentric shaft; a fixed scroll fixed to the housing; a shaft body bearing slidably supporting the rotating shaft body, and an eccentric bearing slidably supporting the eccentric shaft, wherein at least one of the shaft body bearing and the eccentric bearing is a sliding bearing including a back metal, and a sliding layer formed on the back metal by baking, the sliding layer includes 5 to 60 wt % of graphite including particles, with a balance of at least one of a polyamide-imide resin and polyimide resin, the particles has an average diameter of 5 to 50 μm, a graphitization degree of 0.6 or more, an average shape factor $Y_{AVE}$ of 1 to 4, 70% or more of the particles in a number ratio have a shape factor Y of 1 to 1.5, the average shape factor $Y_{AVE}$ is defined by $$Y_{AVE} = SUM[\{PMi^2/4\pi Ai\}]/i$$

fine particles with less than or equal to 0.5 times of the average diameter are not considered in calculating $Y_{AVE}$, the shape factor Y is defined by $$Y = PM^2/4\pi A.$$

Here, PM denotes a periphery length of a single particle, A denotes a cross-sectional area of a single particle, i denotes number of measured particles, and SUM denotes a summation of formulas in [ ] for i particles.

Furthermore, the present invention provides a sliding bearing used in a scroll compressor with the following structures (a) and (b). Structure (a): a scroll compressor (hereinafter referred to as "separate-type shaft scroll compressor") including a rotating shaft body arranged rotatably around an axis of a housing inside the housing, a movable scroll revolving around an eccentric shaft separate from the rotating shaft body and connected to the rotating shaft body to revolve around the axis at a position eccentric to an axis of the rotating shaft body, and a fixed scroll fixed to the housing, wherein the rotating shaft body and the eccentric shaft are slidably supported by each bearing arranged within the housing. Structure (b): a scroll compressor (hereinafter referred to as "integrated-shaft scroll compressor") including a rotating shaft body arranged rotatably around an axis of a housing inside the housing, an eccentric shaft integrated with the rotating shaft body to revolve around the axis at an eccentric position with respect to an axis of the rotating shaft body, a movable scroll fixed to the eccentric shaft, a fixed scroll fixed to the housing, an axis body bearing slidably supporting the rotating shaft body, and an eccentric bearing slidably supporting the eccentric shaft. The present invention is related to a scroll compressor and in a separate-shaft scroll compressor or integrated-shaft scroll compressor at least one of or both the bearing slidably supporting the rotating shaft body and a bearing slidably supporting the eccentric shaft is a sliding bearing, the sliding bearing includes a structure in which a graphite-added resin-based sliding part is formed on a back metal including graphite with an average diameter of 5 to 50 μm, graphitization degree of 0.6 or more and particle ratio of 0.5 or more which includes 5 to 60% by weight of graphite occupying 50% or more of the total number of particles, and the remainder including at least one of a polyimide resin and a polyamide-imide resin. Furthermore, a particle ratio is the ratio between a graphite minor axis and major axis.

In the following explanation, although a separate-shaft type scroll compressor is primarily explained, the present invention may be applied to all scroll compressors in which these shafts are operatively connected so that the rotation of a rotating shaft body is transmitted to an eccentric shaft. Furthermore, "graphite" in the present invention is the "graphite" explained in paragraph 0027 and refers to both graphite defined by the average shape factor and shape factor and graphite defined by a particle ratio. As described in detail below, the particle form of the graphite in the present invention becomes closer to a spherical shape than a usual scale-(flake) shaped graphite.

First, the structure of the entire separate-shaft scroll compressor is explained with an embodiment of a scroll compressor driven by a vehicle engine as shown in FIG. 1. In FIG. 1, 1 denotes a scroll compressor and a housing 2 fixed to an engine (not shown), a rotating shaft body 3 (hereinafter referred to as "rotating shaft") installed rotatably within the housing 2, a movable scroll 4 which rotates via an eccentric shaft by the rotating shaft 3, and a fixed scroll 5 fixed within the housing 2 are basic structural components of the scroll compressor 1.

A further detailed structure than the basic structural components described above is as follows. The interior of the housing 2 is partitioned into a compression chamber SI in which the movable scroll 4 and the fixed scroll 5 are located, and a discharge chamber S2 formed further to the right side in the drawing than the fixed scroll 5. Compression chamber SI has a suction hole (not shown) through which a gas such as a refrigerant flows into the compression chamber S1. Discharge chamber S2 has a discharge hole (not shown) through which the gas is discharged from the discharge chamber S2.

The rotating shaft 3 has an axis that extends in a horizontal direction and includes a small diameter part 3a, a large diameter part 3b, and the crank pin 3c. The small diameter part 3a receives a driving force of an engine. The large diameter part 3b is directly connected coaxially to the small diameter part 3a. The crank pin 3c is arranged at an eccentric position with respect to the rotating shaft 3 including the small diameter part 3a and large diameter part 3b, and transmits a rotational force to the movable scroll 4. Therefore, when the small diameter part 3a is driven by the engine, the large diameter part 3b is coaxially rotated with the small diameter part 3a. Consequently the crank pin 3c revolves at an eccentric position with respect to the small diameter part 3a and large diameter part 3b, and accordingly the movable scroll 4 revolves, that is, rotates.

Among these components, the large diameter part 3b is axially supported by a first bearing 6 (that is, axis body bearing). That is, a ring-shaped member surrounding the large diameter part 3b is the first bearing 6. In addition, an eccentric bushing 7 for transmitting the rotation of the rotating shaft 3 to the movable scroll 4 is arranged between the crank pin 3c and the movable scroll 4, the eccentric bushing 7 includes an inner periphery surface part 7a which axially supports the crank pin 3c, and an outer periphery surface part 7b which slides with the movable scroll 4, and eccentric bushing 7 is arranged at an eccentric position to the inner periphery surface part 7a and outer periphery surface part 7b.

The movable scroll 4 and the fixed scroll 5 have disc-shaped plates 4a and 5a, and wraps 4b and 5b, respectively. The wraps 4b are formed on disc-shaped plates 4a toward disc-shaped plates 5a, and the wraps 5b are formed on disc-shaped plates 5a toward disc-shaped plates 4a, respectively. In the cross-sectional view in the direction orthogonal to the plane of FIG. 1, these wraps 4b and 5b form the spiral-shaped compression chamber S1. That is, the compression chamber S1 is a space surrounded by the plates 4a and 5a and the wraps 4b and 5b.

In addition, a ring-shaped boss 4c is formed on the opposite surface of the wrap 4b in the plate 4a in the movable scroll 4. A second bearing 8 (i.e., an eccentric shaft bearing) fixed to the inner periphery surface of the boss 4c pivotally supports the crank pin 3c. Therefore, when second bearing 8 integrated with the movable scroll 4 rotates, that is, revolves around the central axis, the outer periphery surface part 7b of the eccentric bushing 7 slides with the inner surface of the second bearing 8. Furthermore, a mechanism for preventing the movable scroll 4 from rotating around the central axis of the compressor is arranged between the plate 4a of the movable scroll 4 and housing 2. The fixed scroll 5 is fixed to the housing 2. A linking hole 5c that links the compression chamber S1 and the discharge chamber S2 is drilled in the center of the plate 5a. The linking hole 5c is opened and closed by a lamellar shaped reed valve 10.

According to the scroll compressor 1 having the above structure, when the small diameter part 3a of the rotating shaft 3 rotates by the driving force of an engine, rotational force is applied to the movable scroll 4 through the crank pin 3c and the eccentric bushing 7. At this time, since the rotation of the movable scroll 4 is restricted, the movable scroll 4 revolves while maintaining its posture. In the compression chamber S1, the movable scroll 4 and wraps 4b and 5b of the fixed scroll 5 move relative to each other, and the refrigerant is sucked from a suction port formed in the housing 2. The compressed refrigerant moves to the center of the compression chamber S1 by the relative movement of the wraps 4b, 5b, passes through the through hole 5c and reed valve 10 formed in the plate 5a of the fixed scroll 5, flows into the discharge chamber S2 and is discharged from the discharge hole arranged in the housing 2. The present invention provides a scroll compressor 1 having the above-described structure, in which a sliding bearing is used for one or both of the first bearing 6 and second bearing 8. FIG. 1 shows an example where both the first bearing 6 and second bearing 8 are sliding bearings.

Figure 2:
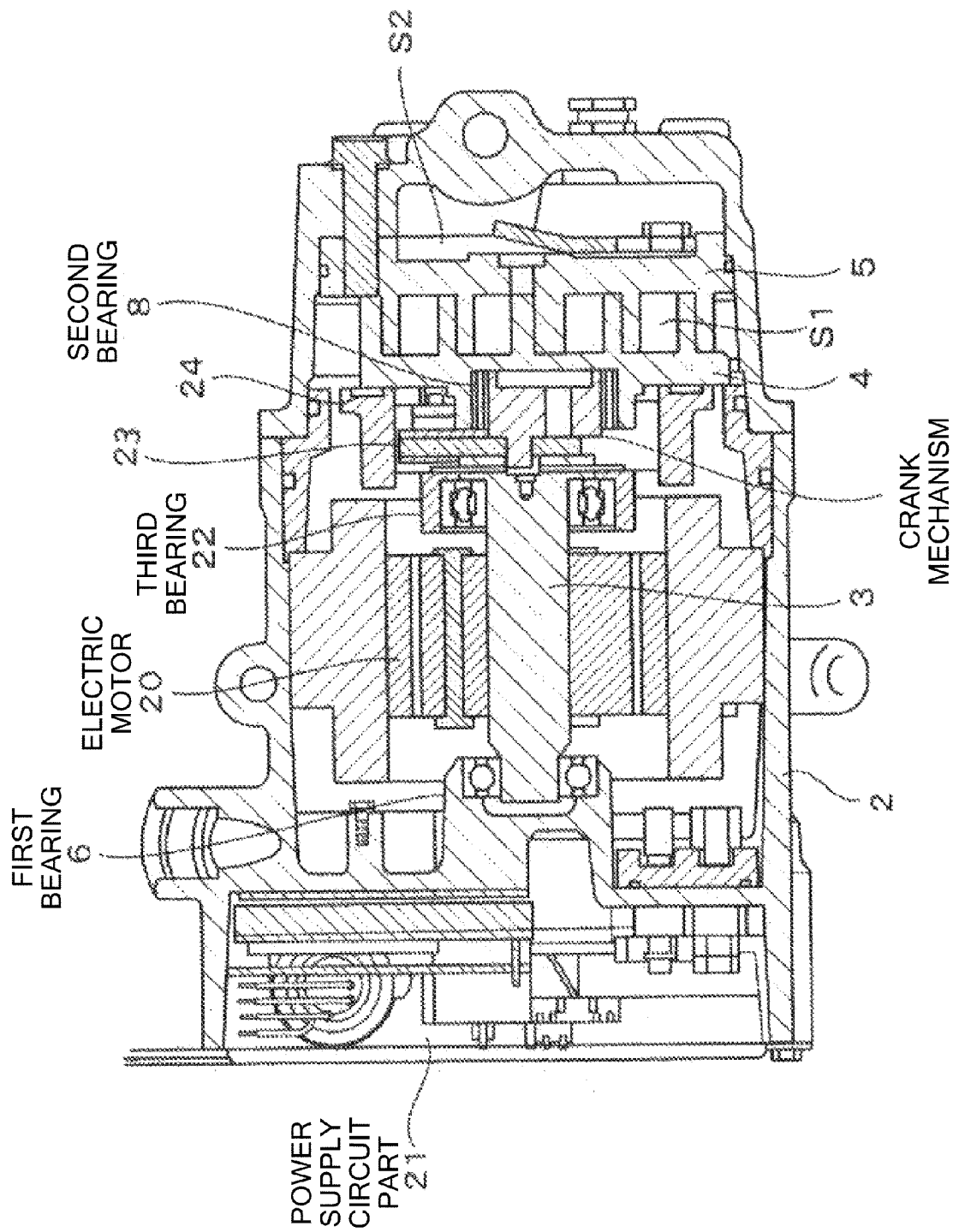
FIG. 2 shows a cross-sectional view of a scroll compressor related to another embodiment.

Next, an embodiment of a separate shaft type scroll compressor driven by an electric motor of a vehicle is explained with referring to FIG. 2 in which elements common with FIG. 1 are denoted by the same reference numerals. The example shown in FIG. 2 includes a motor 20 and a power supply circuit 21 as a specific electric motor driving scroll compressor. Further, the rotating shaft 3 is axially supported by the first bearing 6 (exemplified as a roll bearing in the embodiment) and a third bearing 22 (exemplified as a roll bearing in the embodiment). In the present invention, all of the first bearing 6, the second bearing 8 and the third bearing 22 may be slide bearings. 23 denotes a counter weight and 24 denotes a rotation regulating mechanism.

Figure 3:
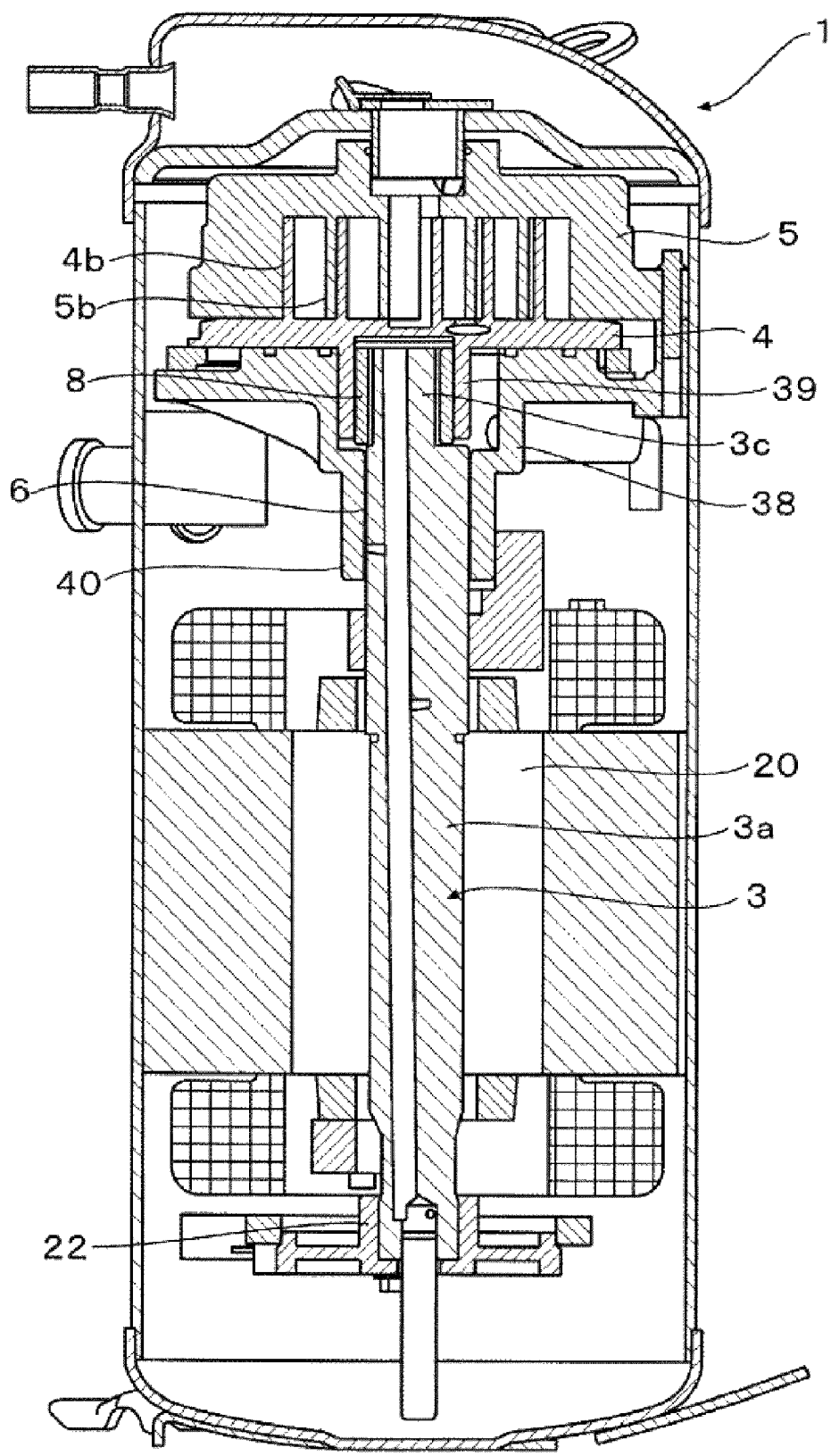
FIG. 3 shows a cross-sectional view of a scroll compressor related to yet another embodiment.

Although a scroll compressor mounted on a vehicle was explained above, the present invention may be applied to household or commercial scroll compressors. It is to be noted that an integrated shaft type is frequently used in household and commercial scroll compressors. FIG. 3 shows an integrated shaft type scroll compressor related to the present embodiment. In FIG. 3, the same elements as in FIGS. 1 and 2 of the present application are denoted with the same reference numerals. In FIG. 3, 38 denotes a crankcase, 39 denotes a cylindrical part extending downwardly from the plate of the movable scroll part and 40 denotes a bearing mounting part. In the integral shaft type scroll compressor integrated with the eccentric shaft 3b, the body 3a of the rotating shaft 3 can use the sliding bearing of the present invention as the first bearing 6, the second bearing 8 and/or the third bearing 22.

Next, a sliding bearing is explained. The sliding bearings 6, 8, and 22 include a backing metal 11, a sliding layer or graphite additive resin-based sliding part (hereinafter referred to as a "sliding layer") 12 as shown in the cross-sectional view in FIG. 4. Generally, the backing metal 11 is made of a steel sheet (JIS-SPCC), a high carbon steel plate having a high strength may be used for the backing metal 11. The thickness of the backing metal 11 is generally 0.5 to 2 mm and a coarse surface part 11a that is formed by sintering is shown on its surface. The coarse surface part may be formed by etching or shot blasting or the like. The sliding layer 12 includes resin and graphite. A material with resin and graphite dispersed in a solvent is impregnated into the coarse surface part 11a and subsequently sintered so as to form the sliding layer 12. The sliding layer 12 generally has a thickness in the range of 5 to 200 μm.

The surface 12a of the sliding layer 12 may be polished, grinded and cut. These processes may be applied alone or in combination. For example, the combination may be polishing to reduce the surface coarseness and the subsequent cutting to form grooves. Alternatively, the combination may be cutting and subsequent polishing to finish.

Next, graphite is explained among the essential components of the sliding layer 12. Expressed in terms of graphitization degree when the graphitization degree for perfect graphite crystal is 1, the degree of crystallinity of the graphite of the present invention is 0.6 or more which almost overlaps with the graphitization degree range of natural graphite and its lubricity and affinity are excellent. Preferably, the degree of graphitization of spherical graphite is 0.8 or more. It is to be noted that, the degree of graphitization is expressed in the following expression defined in C. R. Housaka, "the use of carbon material", Tribologists, Vol. 49, No. 7, 2004, p. 561

$$P_1 = (d_{002} - 3.14)/(3.54 - 3.44)$$

Graphite is generally classified into two types, natural graphite and artificial graphite, and can be further classified into a third type, expanded graphite. Natural graphite is divided into scaly graphite, flake graphite and amorphous graphite. Artificial graphite includes crushed artificial graphite electrodes. Petroleum tar or coke that is carbonized are said to be graphitized carbon and includes mesophase spheres and the like. Graphite can be obtained by sintering graphite carbon at a high temperature. This graphite not only has different manufacturing methods but can also be clearly distinctive by product shape. Recently, it is possible to obtain a spherical ground graphite or spherical graphite powder from the development of spherical fracturing technology (technical documentation of Nippon Graphite Industries Co., Ltd.: Product Name: CGC-100, 50.20; website of ITO GRAPHITE/http://www.graphite.co.jp/seihin.htm).

If the average particle diameter of the graphite is less than 5 μm, there arises a problem that the graphite aggregates. Further, if the average particle diameter of the graphite exceeds 50 μm, there arises a problem that dispersibility becomes worse. The average diameter range of the graphite of the present invention may be 5 to 50 μm. Furthermore, the preferred average diameter is in a range of 5 to 20 μm. It is to be noted that, the average particle diameter was measured using a laser diffraction/scattering particle size distribution analyzer LA-910 manufactured by Horiba Ltd. The larger the value of the graphitization degree of the graphite, the crystallinity improves and lubricity becomes excellent. In the present embodiment, the degree of graphitization may be 0.6 or more and more preferably 0.8 or more.

Next, among the measuring methods of a graphite particle shape, first, a measuring method of an average shape coefficient $Y_{AVE}$ is explained. The average diameter MV of the graphite is expressed by the following equation.

$$MV = \{SUM(V_i^* d_i)\}/SUM Vi = SUM(d_i^3)/SUM(d_i^g) \quad (1)$$

Here, SUM means the summation of the value in parenthesis or the summation of Vi with respect to the number of i. $d_i$ denotes the circle equivalent diameter of one graphite particle. $V_i$ is the volume of one graphite particle. Particles of 0.5 MV or less are not considered in calculating the average shape coefficient in the equation (2). The average shape coefficient $Y_{AVE}$ is calculated using results of measurements with i=1 to n (n number of particles) and is a ratio calculated by dividing the circumferential length of the graphite particles by the cross-sectional area, which is expressed by the following expression.

$$Y_{AVE} = SUM[\{PM_i^2/4\pi A_i\}]/i \quad (2)$$

Figure 8:
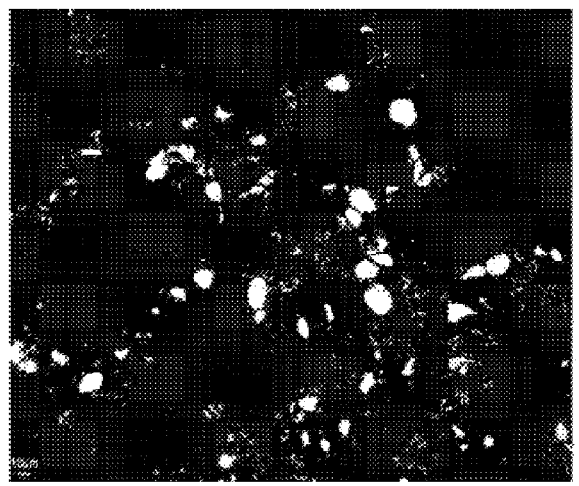
FIG. 8 shows an explanation diagram of a graphite particle shape.

Here, PM denotes the circumference length of one particle, A denotes the cross-sectional area per particle, and SUM denotes the summation of the formula in brackets for all i. The measurement method of the circle equivalent diameter of the graphite particles and the shape coefficient of the graphite particles are as follows. A sliding bearing is cut at an arbitrary position. A photograph of the cut surface is taken with 200 times magnification and a field of view of 0.37 mm×0.44 mm. FIG. 8 shows an example of the photograph. The image of the sliding layer is binarized using an image analysis device. A commercially available analysis device such as LUZEX-FS manufactured by Nireco Co., Ltd. may be used as the image analysis device.

Figure 4:
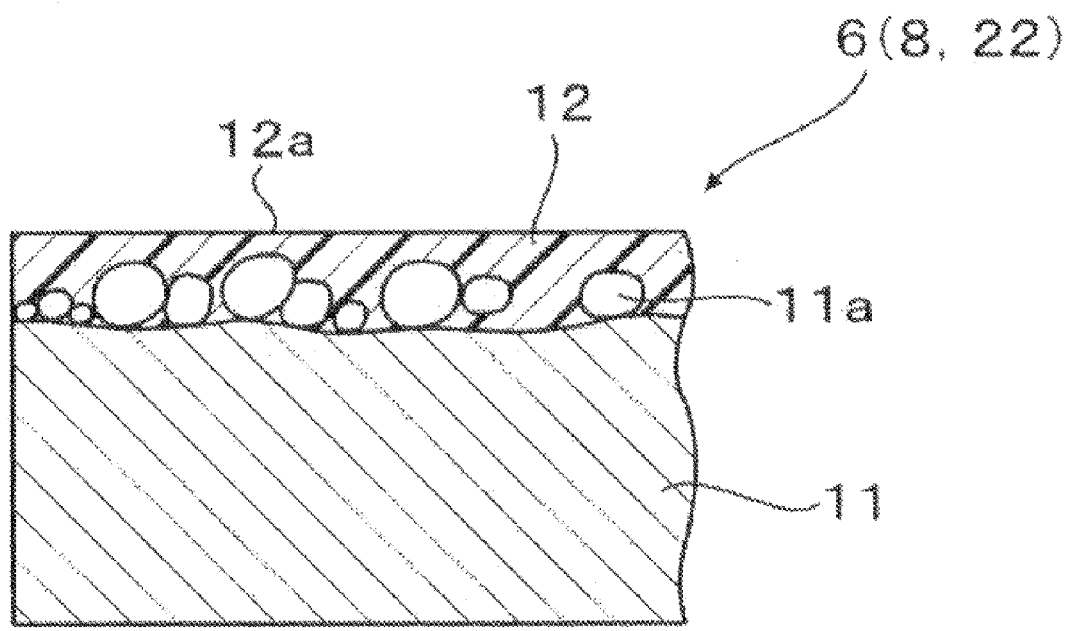
FIG. 4 shows a cross-sectional view of a sliding bearing.

Next, a method of measuring a particle ratio is explained. The first sliding bearing 6 described above is cut at an arbitrary position. A photograph of the cut surface is taken. FIG. 4 shows an example of the photograph. The image of the sliding layer is binarized using an image analysis device. A ratio is obtained by dividing the minimum diameter by the maximum diameter, of the graphite particle shown in the binarized image. A particle having a particle ratio of 0.5 or more has the shape closer to a spherical shape.

There are two definitions for the graphite shape of the present invention: (1) a definition according to an average shape coefficient and shape coefficient; and (2) a definition according to the particle ratio. One graphite shape may satisfy these two definitions (1) and (2). Alternatively, one graphite shape may satisfy only one of these two definitions. In the latter case, with respect to graphite satisfying only the definition (1) and not satisfying the definition (2), the number of graphite particles which do not satisfy the particle ratio requirement of 0.5 or more increases. On the contrary, with respect to graphite not satisfying the definition (1) but satisfying the definition (2), with respect to the remaining graphite of "50% or more" in definition (2), the average shape coefficient $Y_{AVE}$ deviates from the definition (1) and flat graphite increases. Therefore, it is preferred that the graphite shape satisfies both definitions (1) and (2). In the case where only one definition is satisfied, the proportion of flat graphite particles increases but sliding properties are improved.

Figure 6:
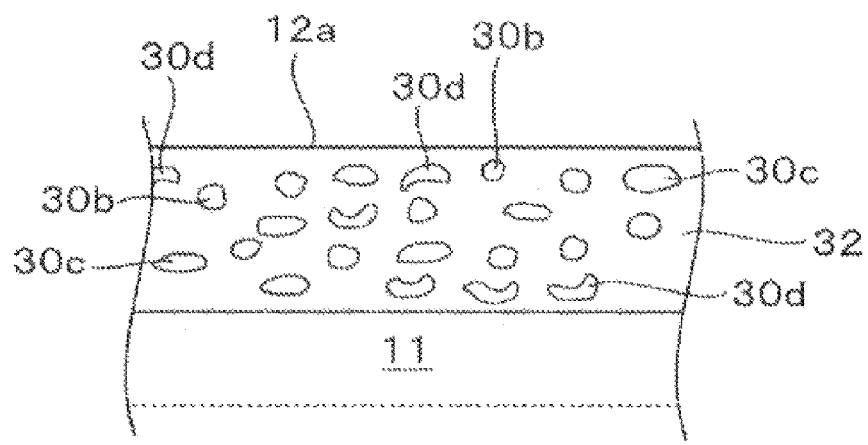
FIG. 6 shows a schematic cross-sectional view of a sliding bearing with the graphite of the present invention dispersed in a resin.

As is shown in FIG. 6, the graphite of the present invention has a curved surface as a whole except for fine graphite particles whose diameter is 0.5 MV or less described above, and except for graphite with a particle ratio of 0.5 or less present in a particle number ratio of less than 50%. The term "as a whole" means that when each particle is observed under a microscopic observation as explained in the previous paragraph and the paragraph before that, the particles are curved or bent which means that there are no sharp edges. As a result, the graphite of the present invention rarely damages a mating shaft (made of steel, for example). As a result of this, the wear resistance of the sliding layer is excellent and the seizure resistance improves the uneven surface of the mating shaft without wearing away the sliding layer. Furthermore, it is difficult for the scale-(flake) like graphite 30a (FIG. 4) to uniformly disperse because its surface contacts or touches, or the particles intertwine. On the other hand, because the graphite defined by the average shape coefficient and shape coefficient defined by a particle ratio of the present invention is formed overall from a curved surface and particles intertwine, it is easy to uniformly disperse in the resin 32. This also contributes to improve sliding properties. It is to be noted that, although it is thought that the edges (FIG. 4, FIG. 12a') of scaly graphite aggregate and adhere and does not exhibit lubricity as explained in "Tribology of graphite material", Tribologist, Vol. 54, No. 1, 2009, pp. 6-7), the edges never contact each other because the edges of graphite 30b and c, defined by an average shape coefficient and shape coefficient or particle ratio of the present invention, disappear or do not have rounded edges.

By using a graphite having a high degree of graphitization and a shape defined by the present invention, the graphite becomes easy to uniformly disperse in a resin such as a polyamide described above, does not orientate within the resin and therefore the ease of cleavage to the graphite no longer occurs in the specific direction.

Natural graphite or spheroidal graphite close to natural graphite may be used as the graphite described above. These graphite have a higher graphitization degree and much higher particle ratio than commercially available flake graphite, amorphous graphite or flake-like graphite or the like. In addition, with regard to the content amount of graphite having the characteristics as described above, a problem arises if the content amount of the graphite is less than 5 wt %, where the seizure resistance is poor and frictional properties are not obtained. Further, another problem arises if the content amount exceeds 60 wt %, where the strength of the sliding material decreases.

Figure 5:
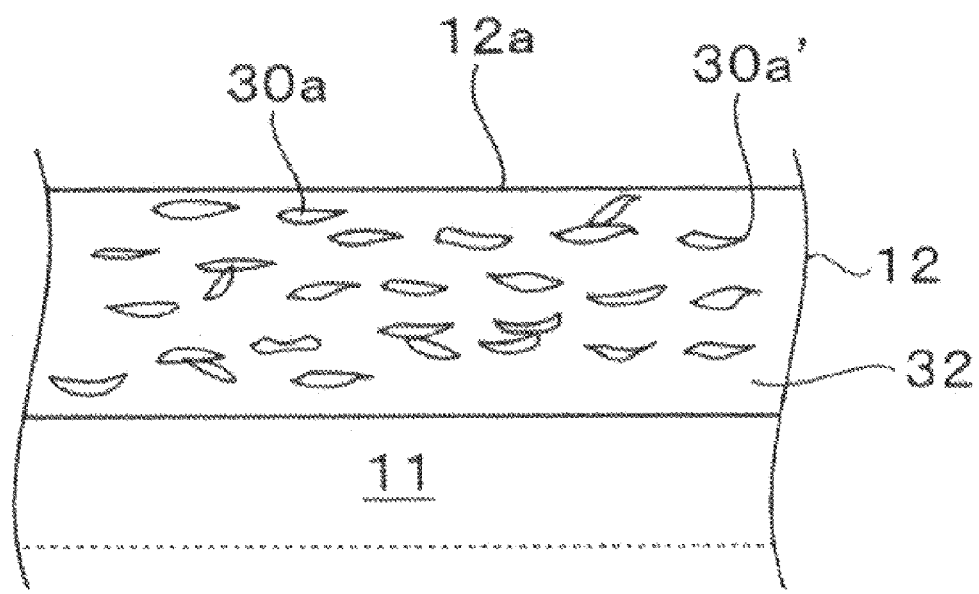
FIG. 5 shows a schematic cross-sectional view of a sliding bearing having a conventional scale (flake) shaped graphite dispersed in a resin.

Orientation of the graphite within a sliding layer is explained with referring to FIGS. 5 and 6 in which the same reference numerals are used for the same elements as in FIG. 4. In FIGS. 5 and 6, 30 denotes graphite particles and 32 denotes a resin. Because scale-(flake) like graphite 30a occupies almost a large flat area and has a small thickness, there are many graphite particles having a particle ratio of less than 0.5. In addition, the average shape factor $Y_{AVE}$ measured at a cross-section of the sliding layer 12 increases. When these graphite particles are dispersed in the resin 32, the flat surface faces the direction of the surface 12a, whereas, since graphite defined by an average shape factor and shape factor among the graphite dispersed in the sliding layer 12 in the present invention are the spherical shape 30b, baguette or rugby ball shape 30c or bead shape 30d, the same graphite shape appears in the cross-section view shown in FIG. 6 and also in the cross-section view in a direction parallel to the surface 12a. The average shape factor $Y_{AVE}$ of these particles is small. The average shaped factor could satisfy $Y_{AVE}=1$ in the case where all the graphite particles are completely spherically shaped. Although it is difficult to turn a raw graphite particle into a perfect spherical shape using spheroidization milling technology, graphite particles having the average shape factor being within the range of $Y_{AVE}=1.2$ to 3.0 show sufficiently excellent performance.

Figure 7:
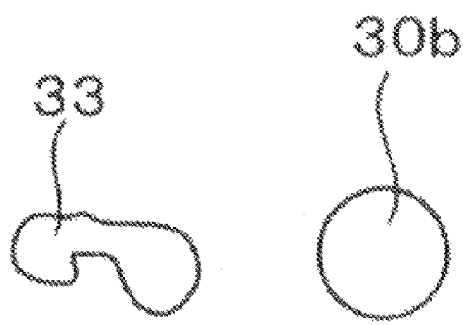
FIG. 7 shows a diagram for explaining an average shape factor of mesophase spheres and spherical graphite.

FIG. 7 shows an example of spherical graphite 30b and mesophase small spheres 33, having the same area. Because mesophase small spheres have a large circumference length, the numerator of an average shape factor $Y_{AVE}$ become greater and as a result the average shape factor $Y_{AVE}$ itself becomes greater. Graphite particles with an average shape factor $Y_{AVE}$ which exceeds 4 or graphite particles with a particle ratio of less than 0.5 have a large shape anisotropy which is unfavorable since they become orientated as shown in FIG. 5. A preferred average shape factor $Y_{AVE}$ is in a range of 2.5 or less. Furthermore, because it is necessary that the ratio of the spherical graphite 30b to the entire graphite is sufficient, in addition to having the average shape factor $Y_{AVE}$ in the preferred range, a ratio of particles having a shape factor Y in the range of Y=1 to 1.5 among all the particles is required to be 70% or more.

In the present invention, it is preferred that the graphite particles are substantially spheroidized ground graphite. Spheroidized ground graphite has the features described above such as being entirely composed of curves or bends with no edges. "Substantially" means that the amount still in the form of the raw material graphite is small due to grinding accuracy and specifically 10 wt % or less is acceptable.

Amount of graphite: low friction properties cannot be obtained when the graphite content is less than 5 wt % and the seizure resistance is poor, whereas the strength of the sliding material decreases when the graphite content exceeds 60 wt %.

In the sliding layer, the remainder of the graphite described above is a polyimide (PI) and/or polyamide-imide (PAI) resin. A solid powder or a liquid polyester-imide, aromatic polyimide, polyetherimide, and bismaleimide may be used as the polyimide. An aromatic polyamide-imide resin may be used as the polyamide-imide resin. Each of these resins has features such as an excellent heat resistance and a small friction coefficient.

In order to reduce the friction of the sliding bearing of the present invention, the sliding layer may include at least one of clay, mullite, and talc with a particle diameter of less than 10 μm as a friction modifier. The friction modifier may be included in an amount of 0.5 to 20 wt % with respect to the entire sliding layer 12. However, it is preferred that the total amount of the friction modifier and graphite be in a range from 5.5 to 80 wt %. The mullite and clay are used in order to improve the wear resistance of the sliding layer because it is a hard substance. Since the talc layers included in the talc are combined by a weak Van der Waals force interacting between the layers, it easily peels between layers and is mixed into a sliding layer. Therefore, friction adjustment effects can be obtained by using a sliding layer including the talc. With regard to the content amount of friction modifier, if it is less than 0.5 wt %, the friction reducing effect is insufficient. Further, if the content amount exceeds 20 wt %, the mating material could be damaged and the wear resistance becomes insufficient. Therefore, the content amount of the friction modifier is preferred to be 5 to 15 wt %. With regard to the particle size of the friction modifier, if it exceeds 10 μm, aggressiveness towards the mating material increases. With regard to the total amount of the friction modifier and the spheroidal graphite, if it is less than 5.5 wt %, the amount of wear of the sliding layer increases. If the total amount exceeds 80 wt %, problems such as insufficient heat resistance and strength occur.

Further, in order to improve the lubricity of the sliding bearing of the present invention, the sliding layer 12 may include 1 to 40 wt % of a solid lubricant that includes one or more among PTFE, $MoS_2$ or BN. In such a case, it is preferred that the total amount of the graphite, the friction modifier, and the solid lubricant be in the range of 6.5 to 80 wt %. If the amount of the solid lubricant is less than 1 wt %, the effects of the solid lubricant could be insufficient. If the amount of the solid lubricant exceeds 40 wt % or the total amount of the solid lubricant, the graphite, and friction modifier exceeds 80 wt %, problems occur such a decrease in heat resistance and strength. Similarly, the sliding layer may have impregnated a total amount of 10 vol % of at least one of silicone oil, machine oil, turbine oil and mineral oil. Among the solid lubricants described above, $MoS_2$ has cleavage properties similar to the graphite and a random alignment is preferred in order to make the ease of a cleavage occurring almost constant due to the sliding direction in the present invention. Since $MoS_2$ has an orientation due to the flat shape of the particles, since the orientation occurs when the viscosity of the resin is low during mixing and application of the resin, considering this point random orientation can be achieved when a sliding layer is formed.

EFFECTS OF THE INVENTION

The reasons why the sliding bearing used in the scroll compressor related to the present invention has a better wear resistance, seizure resistance and quietness than a conventional roll bearing is that it is soft due to the excellent crystallinity of the graphite and it is believed that the graphite is uniformly dispersed in the resin. That is, because the graphite itself in conventional flake graphite has a large anisotropic shape and cannot be uniformly dispersed when dispersed in a resin, wear and seizure occur easily in graphite particles orientated in an unfavorable direction. Noise is also generated due to this wear. Furthermore, although sphericity is high in a hard carbon material such as spherical carbon, a mating shaft becomes worn and as a result seizure and noise easily occur. However, because the graphite of the present invention is soft and graphite defined by particle ratio or either the average shape factor and shape factor is dispersed uniformly with no orientation, the wear condition remains constant from initial sliding throughout the entire period of use.

The durability of the scroll compressor including the sliding bearing of the present invention is improved. Further, quietness is also improved. In addition, the present invention allows the compressor be lighter by replacing the roll bearing with a sliding bearing. Further, the press-fit part (ring the boss) to the orbiting scroll and counterweight also becomes lighter because the external diameter of the bearing becomes smaller. Since the counterweight becomes lighter, the compressor becomes smaller. In addition, since the resin of the sliding bearing is excellent in foreign material embedding properties, the stability and durability of the sliding layer of the present invention can be ensured. Furthermore, the bearing becomes cheaper.

DETAILED DESCRIPTION OF EXEMPLARY EMBODIMENTS

For evaluating the scroll compressor, the characteristics relating to wear resistance and seizure resistance are measured. In the measurements, first sliding bearing 6 and second sliding bearing 8 (FIG. 1) having the sliding layer 12 including the graphite having the average shape factor $Y_{AVE}$ and shape factor Y described above, are used in the scroll compressor 1 driven by the engine of a vehicle. The wear depth after the operation and the surface pressure at the time when seizure occurs, are measured. In the case where the sliding bearing related to the present invention is provided in the scroll compressor 1, the following is apparent compared to the scroll compressor provided with a sliding bearing dispersed with conventional flake-shaped graphite. First, both the amount of wear and seizure surface pressure show good balance and good values. That is, when graphite in the sliding layer 12 satisfies the conditions described above, the orientation of lead becomes non-directional and low friction due to cleavage of the graphite being exhibited stably, regardless of this orientation. In other words, in these circumstances when the rotating shaft rotates and the movable scroll 4 revolves, stable seizure resistance is assisted even if various movements are generated due to vibration. Similar performance is exhibited in the case where the sliding layer described above is arranged on the first to third sliding bearings 6, 8, and 22 of the scroll compressor (FIG. 2) driven by an electric motor vehicle.

In addition, the degree of graphitization as described above is high and since graphite near a spherical shape can be dispersed uniformly in the resin and there is no thin parts, seizure resistance is improved because it is possible to reduce the surface coarseness of the sliding bearing without local deficiencies even when the graphite is exposed to the sliding parts with the mating material. With regards to sliding of the sliding bearing of the scroll compressor, in the case where the graphite is exposed to the mating material during sliding, the graphite degree according to the present invention is high, and because the graphite is nearly spherical and uniformly dispersed in the resin, coarseness is kept constant without local deficiencies and without making the sliding surface coarse, the sliding characteristics are favorably maintained. On the other hand, with graphite having a low degree of graphitization or particle shape which is far from spherical, the graphite cracks and falls off when exposed to the sliding parts with the mating material, the sliding surface becomes coarse and seizure resistance is reduced and in the case of flat graphite, the cleavage direction becomes oriented to face a different direction from the sliding direction and thereby frictional resistance is increased.

Next, the composition of a graphite additive resin-based sliding part (referred to as "graphite additive resin-based sliding part" hereinafter) 12 defined by a particle ratio of the first and the second sliding bearings 6 and 8 is explained. Furthermore, since the structure other than this is the same as the first and second sliding bearings 6 and 8 in the sliding layer dispersed with graphite defined by the average shape factor $Y_{AVE}$ and average shape factor Y, a detailed explanation is omitted. The graphite additive resin-based sliding part 12 includes 5 to 60 wt % of graphite (note that, graphite with a particle number ratio of 50% or more are particles ratio of 0.5 or more), and at least one of 20 to 90 wt % of polyimide and polyimide-amide as essential components. Further, the graphite additive resin-based sliding part 12 may include a friction modifier consisting of at least one from 0.5 to 20 wt % of clay, mullite, silica and alumina. Further, the graphite additive resin-based sliding part 12 may include 40 wt % or less of a solid lubricant including at least one or more from PTFE, $MoS_2$ or BN, and/or 10 vol % or less of oil including at least one of silicone oil, machine oil, turbine oil and mineral oil.

Artificial or natural graphite may be used as the graphite described above. A particle diameter of the graphite is preferred to be 250 μm or less. With regard to the content of the graphite, if the content of the graphite is less than 5 wt %, the friction coefficient increases and the wear amount increases. Further, if the content of the graphite exceeds 60 wt %, a problem occurs where the bonding force with the resin or back metal 11 becomes weak and the amount of wear increases. The content of the graphite is preferred to be in a range of 30 to 60 wt %.

With regard to the content of the polyimide and the polyimide-amide, if the content of the polyimide and polyimide-amide is less than 20 wt %, the binding force becomes weak and the amount of wear increases. Further, if the content exceeds 90 wt %, a problem arises where the friction coefficient increases and the amount of wear increases. The content is preferred to be in a range of 30 to 60 wt %. With regard to the content of the friction modifier, if the content is less than 0.5 wt %, a problem arises where the wear resistance becomes insufficient. Further, if the content exceeds 20 wt %, a problem arises where the mating material is damaged and the wear resistance of the mating material is decreased.

With regard to the content of the solid lubricant, if the content exceeds 40 wt %, a problem arises where the strength decreases and heat resistance is insufficient. The content is preferred to be in a range of 5 to 20 wt %. With regard to the content of the oil, if the content of the oil exceeds 10 vol %, a problem arises where the strength decreases and heat resistance is insufficient. The content is preferred to be 0.1 vol % or more and more preferably 1 to 10 vol %.

The present invention is described in more detail using the examples below. A carbon steel sheet of 140 mm×1.5 mm is prepared for a back metal. A bronze powder (Sn 10%, +80, −150 mesh) is prepared for a coarse surface part, which is formed on the back metal. After degreasing the back metal, 0.05 to 0.1 g per unit area ($cm^2$) of the bronze powder was placed on the back plate. Then, the back metal was baked at 830 to 850° C. to form the coarse surface part. The thickness of the coarse surface part is about 150 μm. The porosity calculated on the basis of the specific gravity of bronze was 40 to 80%. Table 2 shows the composition of the sliding layer for the examples. The components were mixed with a solvent, and impregnated to the coarse surface part. The mixture was dried at 100° C. The mixture was hardened by pressure in a cold state. Finally, the mixture was baked at 250° C. to form a sliding layer. The thickness of the sliding layer was about 80 μm. Thus, bimetallic material samples were obtained. The bimetallic material samples were processed to produce bushings. Spherical ground graphite manufactured by Nippon Graphite Industries Co., Ltd. (product name CGB10) was used as the "graphite" in Table 1. The "graphite" column in Table 2 shows the content (wt %). Further, the average shape factor $Y_{AVE}$ of the graphite is shown in parenthesis. In the Examples 1 to 18 of the present invention, particles with a shape factor in a range of Y=1–1.5 were present in an amount of 80 to 90% by number ratio.

Figure 9:
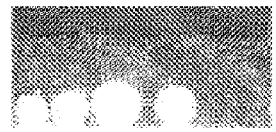
FIG. 9 shows a micrograph of a sliding layer of an experiment material in Example 14 of the present invention.

Measurement of the particle ratio of graphite was performed as follows. With regard to Example 11 in Table 2, a micrograph of the sliding layer above the sintered alloy particles on the sliding surface side, was taken. FIG. 9 shows a cross-sectional micrograph of Example 11. The micrograph was binarized using an image analysis apparatus. The number of graphite particles identified in the binarized image is 103 in the measured view. Measuring the ratio of minimum diameter/maximum diameter ratio for each graphite particle, the number of particles having the ratio of 0.5 or more was 74, which means that the particles has an existence ratio of 72% among all the particles. With regard to Comparative Examples 2 and 3, it was found that the existence ratio of 0.5 or more was 11.4% and 48%, respectively.

Details of the components in the examples other than graphite were as follows.

Polyimide resin: Product of Toray Industries, Inc.
Polyamide-imide resin: Product of Hitachi Chemical Industries. Inc.
Clay: Product of Shiraishi Calcium; average particle diameter 1 μm
Mullite: Product of KCM.; average particle diameter 0.8 μm
Talc: Product of Nippon Talc Co.; average particle diameter 1 μm
PTFE: Product of Asahi Glass Co.; average particle diameter 9 μm
$MoS_2$: Product of Sumikojunkatsuzai; average particle diameter 1.4 μm
BN: Product of Mitsui Chemicals, Inc.; average particle diameter 1 μm Table 2 shows the experimental results of the sliding bearings that were manufactured with the components described above. Here, the graphite and scale shape in the table have an average particle diameter of 5 to 50 μm and degree of graphitization of 0.6. The average shape factor $Y_{AVE}$ is significantly different. With regard to the scale shape graphite, the shape factor $Y_{AVE}$ is 10 or more. Therefore, the average shape factor $Y_{AVE} \approx 10$ is a threshold of the shape of conventional graphite and the graphite characterized by the present invention.

The experiment method is as follows.
Abrasion Resistance Experiment
Experiment Apparatus: Plate on ring test experiment apparatus
Lubrication: liquid paraffin
Load: 50 kgf (fixed)
Speed: 5 m/s
Experiment time: 60 minutes
Evaluation method: Wear depth after the operation
Seizure Resistance Test
Experiment Apparatus: Thrust Experiment Apparatus
Lubrication: liquid paraffin
Load: Progressive Load
Speed: 10 m/s
Experiment time: 60 minutes
Evaluation method: Evaluated at surface pressure when the seizure occurred.

The experiment results are shown in Table 2. In addition, a cross-sectional photograph of the sample of Example 14 is shown in FIG. 9.

TABLE 2

| category | No | Composition (weight %) Graphite Average Diameter | Graphitization Degree | Graphite ($Y_{AVE}$) | Scale Shape ($Y_{AVE}$) | Resin PI | PAI | Friction Modifier Clay | Mullite | Talc | Solid Lubricant PTFE | $MoS_2$ | BN | characteristic Amount of Wear (μm) | Seizure Surface Pressure (MPa) |
|---|---|---|---|---|---|---|---|---|---|---|---|---|---|---|---|
| Comparative Examples | 1 | 15 | 0.30 | 40(1.8) | — | 15 | 15 | 15 | — | — | — | — | — | 2 | 28 |
|  | 2 | 30 | 0.75 | — | 50 | 25 | 25 | — | — | — | — | — | — | 26 | 38 |
|  | 3 | 30 | 0.30 | — | 50 | 25 | 25 | — | — | — | — | — | — | 35 | 15 |
|  | 4 | 45 | 0.75 | — | 10 | 5 | 40 | — | 5 | — | — | — | — | 33 | 28 |
|  | 5 | 2 | 0.75 | — | 25 | 30 | 30 | — | 15 | — | — | — | — | 25 | 36 |
| Examples | 1 | 5 | 0.65 | 50(1.2) | — | 10 | 10 | — | — | 10 | — | — | — | 6 | 50 |
|  | 2 | 15 | 0.67 | 60(1.8) | — | 35 | 5 | — | — | — | — | — | — | 20 | 48 |
|  | 3 | 15 | 0.67 | 30(1.8) | — | 10 | 20 | — | — | 20 | 20 | — | — | 15 | =>60 |
|  | 4 | 23 | 0.73 | 40(2.1) | — | 20 | 5 | 20 | — | — | 15 | — | — | 3 | =>60 |
|  | 5 | 45 | 0.75 | 50(3.0) | — | 25 | 25 | — | — | — | — | — | — | 15 | 42 |
|  | 6 | 45 | 0.75 | 25(3.0) | — | 30 | 30 | — | 15 | — | — | — | — | 7 | 52 |
|  | 7 | 5 | 0.85 | 60(1.2) | — | 15 | 15 | — | — | — | 10 | — | — | 16 | 52 |

TABLE 2-continued

| category | No | Average Diameter | Graphite Graphitization Degree | Graphite ($Y_{AVE}$) | Scale Shape ($Y_{AVE}$) | Resin PI | Resin PAI | Friction Modifier Clay | Friction Modifier Mullite | Friction Modifier Talc | Solid Lubricant PTFE | Solid Lubricant $MoS_2$ | Solid Lubricant BN | Amount of Wear (μm) | Seizure Surface Pressure (MPa) |
|---|---|---|---|---|---|---|---|---|---|---|---|---|---|---|---|
| | 8 | 5 | 0.85 | 30(1.2) | — | 20 | 20 | — | — | — | — | 30 | — | 18 | 58 |
| | 9 | 32 | 0.82 | 20(2.7) | — | 15 | 20 | — | 20 | — | — | — | 25 | 13 | 52 |
| | 10 | 10 | 0.93 | 30(1.3) | — | 20 | 5 | — | 5 | — | 40 | — | — | 6 | =>60 |
| | 11 | 10 | 0.95 | 35(1.3) | — | 15 | 15 | 15 | — | — | 20 | — | — | 4 | =>60 |
| | 12 | 10 | 0.93 | 30(1.3) | — | 25 | 25 | 5 | — | — | — | 15 | — | 8 | 46 |
| | 13 | 20 | 0.95 | 5(2.1) | — | 50 | — | — | 20 | — | — | 25 | — | 8 | =>60 |
| | 14 | 20 | 0.95 | 30(2.1) | — | 20 | 20 | 10 | — | — | 20 | — | — | 5 | =>60 |
| | 15 | 20 | 0.95 | 15(2.1) | — | 35 | 5 | — | — | — | — | — | 40 | 19 | 56 |
| | 16 | 45 | 0.94 | 45(3.0) | — | 5 | 40 | 10 | — | — | — | — | — | 5 | 46 |
| | 17 | 45 | 0.94 | 10(3.0) | — | 5 | 40 | — | 5 | — | 40 | — | — | 15 | >60 |
| | 18 | 10 | 0.93 | 20(1.3) | — | 25 | 25 | — | 5 | — | — | 25 | — | 4 | =>60 |

Although Comparative Example 1 uses spherical graphite, because the graphitization degree is low, the seizure resistance is poor. Because Comparative Examples 2 to 5 use the flake-shaped graphite, wear resistance and seizure resistance is bad. However, these properties are superior in the Examples of the present invention.

INDUSTRIAL APPLICABILITY OF THE INVENTION

As explained above, because the vehicle-mounted scroll compressor of the present invention uses a sliding bearing instead of the conventional roll bearing, the present invention is excellent in terms of size and weight, quietness, and price. In addition, when a household scroll compressor is compared with the conventionally used sliding bearing, the household scroll compressor has excellent stability characteristics when used for a long period of time.

What is claimed is:

1. A scroll compressor comprising:
a rotating shaft body that is installed in a housing and rotates around an axis of the housing;
a movable scroll revolving around an eccentric shaft separate from the rotating shaft body and connected to the rotating shaft body to revolve around the axis at a position eccentric to an axis of the rotating shaft body;
a fixed scroll fixed to the housing; and
bearings that slidably support the rotating shaft body and the eccentric shaft, the bearings being installed within the housing,
wherein
at least one of the bearings is a sliding bearing including a back metal, and
a sliding layer formed on the back metal by baking, the sliding layer includes 5 to 60 wt % of graphite including particles,
with a balance of at least one of polyamide-imide resin and polyimide resin,
the particles has
an average diameter of 5 to 50 μm,
a graphitization degree of 0.6 or more, and
50% or more of the particles in a number ratio have a particle ratio more than or equal to 0.5, the particle ratio being a ratio between a graphite minor axis and major axis.

2. A scroll compressor comprising:
a rotating shaft body that is installed in a housing and rotates around an axis of the housing;
a movable scroll revolving around an eccentric shaft integrated with the rotating shaft body to revolve around the axis at a position eccentric to an axis of the rotating shaft body; and
a fixed scroll fixed to the housing; and
bearings that slidably support the rotating shaft body and the eccentric shaft, the bearings being installed within the housing,
wherein
at least one of the bearings is a sliding bearing including a back metal, and
a sliding layer formed on the back metal by baking, the sliding layer includes
5 to 60 wt % of graphite including particles,
with a balance of at least one of polyamide-imide resin and polyimide resin,
the particles has
an average diameter of 5 to 50 μm,
a graphitization degree of 0.6 or more, and
50% or more of the particles in a number ratio have a particle ratio more than or equal to 0.5, the particle ratio being a ratio between a graphite minor axis and major axis.

3. A scroll compressor comprising:
a rotating shaft body that is installed in a housing and rotates around an axis of the housing;
an eccentric shaft integrated with the rotating shaft body so as revolve around the axis at a position eccentric with respect to a shaft axis of the rotating shaft body;
a movable scroll fixed to the eccentric shaft;
a fixed scroll fixed to the housing;
a shaft body bearing slidably supporting the rotating shaft body, and
an eccentric bearing slidably supporting the eccentric shaft,
wherein
at least one of the shaft body bearing and the eccentric bearing is a sliding bearing including
a back metal, and
a sliding layer formed on the back metal by baking, the sliding layer includes
5 to 60 wt % of graphite including particles,
with a balance of at least one of polyamide-imide resin and polyimide resin, the particles has
an average diameter of 5 to 50 μm,
a graphitization degree of 0.6 or more,
an average shape factor $Y_{AVE}$ of 1.2 to 3.0,
70% or more of the particles in a number ratio have a shape factor Y of 1 to 1.5,
the average shape factor $Y_{AVE}$ is defined by $$Y_{AVE} = SUM[\{PMi^2/4\pi Ai\}]/i$$

fine particles with less than or equal to 0.5 times of the average diameter are not considered in calculating $Y_{AVE}$,
the shape factor Y is defined by $$Y = PM^2/4\pi A$$

PM denotes a periphery length of a single particle,
A denotes a cross-sectional area of a single particle,
i denotes number of measured particles, and
SUM denotes a summation of formulas in [ ] for i particles.

4. A scroll compressor comprising:
a rotating shaft body that is installed in a housing and rotates around an axis of the housing;
an eccentric shaft connected to the rotating shaft body to revolve around the axis at a position eccentric to an axis of the rotating shaft body;
a movable scroll fixed to the eccentric shaft;
a fixed scroll fixed to the housing;
a shaft body bearing slidably supporting the rotating shaft body, and
an eccentric bearing slidably supporting the eccentric shaft,
wherein
at least one of the shaft body bearing and the eccentric bearing is a sliding bearing including
a back metal, and
a sliding layer or graphite additive resin-based sliding part formed on the back metal by baking,
the sliding layer includes
5 to 60 wt % of graphite including particles,
with a balance of at least one of polyamide-imide resin and polyimide resin, the particles have
an average diameter of 5 to 50 μm,
a graphitization degree of 0.6 or more,
an average shape factor $Y_{AVE}$ of 1.2 to 3.0,
70% or more of the particles in a number ratio have a shape factor Y of 1 to 1.5,
the average shape factor $Y_{AVE}$ is defined by $$Y_{AVE} = SUM[\{PMi^2/4\pi Ai\}]/i$$

fine particles with less than or equal to 0.5 times of the average diameter are not considered in calculating $Y_{AVE}$,
the shape factor Y is defined by $$Y = PM^2/4\pi A$$

PM denotes a periphery length of a single particle,
A denotes a cross-sectional area of a single particle,
i denotes number of measured particles, and
SUM denotes a summation of formulas in [ ] for i particles.

5. The scroll compressor according to claim 4, wherein the graphite consists of substantially spheroidized group graphite.

6. The scroll compressor according to claim 4 used for an automobile air conditioner.

7. The scroll compressor according to claim 6 driven by an engine of a vehicle.

8. The scroll compressor according to claim 6 driven by an electric motor mounted on a vehicle.

9. The scroll compressor according to claim 4, wherein the compressor is used in household and commercial air-conditioning equipment and is driven by an electric motor.

10. The scroll compressor according to claim 4, wherein the sliding layer or graphite additive resin-based sliding part further includes 0.5 to 20 wt % of a friction modifier consisting of at least clay, mullite or talc with a particle diameter of less than 10 μm, and
a total amount of the friction modifier and the graphite is in the range of 5.5 to 80 wt. %.

11. The scroll compressor according to claim 4, wherein the sliding layer includes 1 to 40 wt % of a solid lubricant consisting of at least one of PTFE, $MoS_2$, or BN, and
a total amount of the solid lubricant, the graphite and friction modifier is in the range of 6.5 to 80 wt %.

12. The scroll compressor according to claim 10, wherein the sliding layer includes 10 vol % or less of an oil consisting of at least one of silicon oil, machine oil, turbine oil and mineral oil.

13. The scroll compressor according to claim 4, wherein a surface of the sliding layer or graphite additive resin-based sliding part is processed by at least one of polishing, grinding, or cutting.

14. The scroll compressor according to claim 4, wherein
a coarse surface part is formed by sintering bronze powder on a surface of the back metal and
the sliding layer or graphite additive resin-based sliding part is further formed on a surface of the coarse surface part.

* * * * *